(12) United States Patent
Hall

(10) Patent No.: US 7,415,057 B2
(45) Date of Patent: Aug. 19, 2008

(54) UNSTABLE OPTICAL RESONATOR AND LASER DEVICE

(75) Inventor: Thomas Hall, Wildberg (DE)

(73) Assignee: Deutsches Zentrum fur Luft-und. Raumfahrt E.V., Cologne (DE)

( * ) Notice: Subject to any disclaimer, the term of this patent is extended or adjusted under 35 U.S.C. 154(b) by 156 days.

(21) Appl. No.: 11/061,380

(22) Filed: Feb. 18, 2005

(65) Prior Publication Data

US 2005/0195881 A1 Sep. 8, 2005

(30) Foreign Application Priority Data

Feb. 21, 2004 (DE) .................... 10 2004 008 640

(51) Int. Cl.
*H01S 3/08* (2006.01)

(52) U.S. Cl. .............. 372/95; 372/98; 372/99

(58) Field of Classification Search .......... 372/95, 372/98–99
See application file for complete search history.

(56) References Cited

U.S. PATENT DOCUMENTS

| | | | | |
|---|---|---|---|---|
| 4,126,381 A * | 11/1978 | Chodzko et al. | ............ | 359/859 |
| 5,123,028 A | 6/1992 | Hobart et al. | | |
| 5,125,001 A * | 6/1992 | Yagi et al. | ............ | 372/92 |
| 5,157,684 A | 10/1992 | Benda et al. | | |
| 5,216,689 A | 6/1993 | Gardner et al. | | |
| 5,335,242 A | 8/1994 | Hobart et al. | | |
| 5,392,309 A * | 2/1995 | Nishimae et al. | ............ | 372/95 |
| 5,434,882 A * | 7/1995 | Chang | ............ | 372/92 |
| 5,561,550 A * | 10/1996 | Tanuma | ............ | 359/330 |
| 5,822,354 A * | 10/1998 | Vitruk | ............ | 372/92 |
| 6,144,687 A * | 11/2000 | Jackson | ............ | 372/99 |
| 6,442,186 B1 * | 8/2002 | Vitruk | ............ | 372/95 |
| 6,442,187 B1 * | 8/2002 | Dutov et al. | ............ | 372/101 |
| 6,606,339 B1 | 8/2003 | Greninger | | |
| 2003/0214993 A1 * | 11/2003 | Baker | ............ | 372/92 |
| 2004/0136433 A1 * | 7/2004 | Kuznetsov | ............ | 372/92 |

FOREIGN PATENT DOCUMENTS

DE 102 30 522 A1 1/2003
GB 2 276 031 A 9/1994

OTHER PUBLICATIONS

Demtröder, Wolfgang, *Laser Spectroscopy*, 1998, pp. 239-244, Springer-Verlag Berlin Heidelberg New York.
Kuba et al., "Improvement of slab-laser beam divergence by using an off-axis unstable-stable resonator", *Optics Letters*, 1990, pp. 121-123, vol. 15, No. 2.
Shih, Chun-Ching, "Analysis of stable-unstable free electron laser resonators", *SPIE*, 1993, pp. 278-285, vol. 1868.
Siegman, Anthony E., *Lasers*, 1986, pp. 860-862, University Science Books, Mill Valley, California.

* cited by examiner

*Primary Examiner*—Minsun Harvey
*Assistant Examiner*—Phillip Nguyen
(74) *Attorney, Agent, or Firm*—Alston & Bird LLP

(57) ABSTRACT

An unstable optical resonator for an optically active medium comprising a spherical back mirror and a spherical outcoupling mirror is proposed, and an outcoupling which is asymmetrical in relation to the optical axis takes place therein.

27 Claims, 5 Drawing Sheets

UNSTABLE OPTICAL RESONATOR AND LASER DEVICE

CROSS-REFERENCE TO RELATED APPLICATION

The present application claims the benefit of German Application No. 10 2004 008 640.0, filed Feb. 21, 2004, which is incorporated herein by reference in its entirety and for all purposes.

FIELD OF THE INVENTION

The invention relates to a resonator for an optically active medium. The invention further relates to a laser device and, in particular, a gas laser device with such a resonator.

BACKGROUND OF THE INVENTION

Optical resonators are known, for example, from the publication "Optische Resonatoren für Hochleistungs-Festkörper-Laser" (Optical Resonators for high-power solid-state Lasers) by N. Hodgson, Festkörper-Laser-Institut Berlin GmbH, internal report, December 1990 or from the article "Analysis of stable-unstable free electron laser resonators" by C.-C. Shih, *SPIE* Vol. 1868, pages 278 to 285. The article "Improvement of slab-laser beam divergence by using an off-axis unstable-stable resonator" by K. Kuba et al. (*Optics Letters*, Vol. 15, 1990, pages 121 to 123) also discloses resonators. In particular, cylindrical mirrors are used in the optical resonators disclosed in these references.

SUMMARY OF THE INVENTION

In accordance with the invention, a resonator is provided which is usable for optically active media with small gain and large cross section. In accordance with the invention, an unstable optical resonator for an optically active medium comprises a spherical back mirror and a spherical output mirror, and an outcoupling which is asymmetrical in relation to the optical axis takes place therein. A purely unstable resonator is made available by the use of spherical mirrors. Formation of a high multimode in a stable direction, as in the case of cylindrical mirrors, is thereby prevented. This, in turn, results in a time-independent mode, and an intensity distribution which is not too highly structured is also provided in the far field. In comparison with cylindrical mirrors, the inventive resonator with the spherical mirrors is considerably easier to adjust, and it is also considerably less sensitive to deviations in mirror radii and tiltings.

The resonator according to the invention can be used for media with a large cross section. In particular, there are no limitations with respect to the lateral dimensions, as is, for example, the case with cylindrical mirrors. Spherical mirrors are less expensive to manufacture and easier to obtain and, therefore, the manufacturing costs of the inventive resonator are reduced. Cylindrical mirrors are optimized with respect to a rectangular medium cross section. The inventive resonator can be used with any medium cross sections. In particular, adaptation to any medium cross sections can be carried out by using a scraper.

Owing to the asymmetrical outcoupling, a more compact outcoupling surface (with smaller divergence) is made available, which provides for a far field with a reduced structure. In particular, an asymmetrical confocal unstable negative-branch resonator is made available in accordance with the invention.

A concave mirror surface of the back mirror advantageously faces the optically active medium. Furthermore, a concave mirror surface of the outcoupling mirror faces the optically active medium. A confocal resonator is thereby provided. This resonator is, in turn, unstable in all directions. Such a resonator is less sensitive to adjustment and also less sensitive to deviations in mirror radii and tiltings than, for example, a resonator with cylindrical mirrors.

The focal points of the back mirror and the outcoupling mirror advantageously lie between these two mirrors. Provision is made for the center point of a sphere (an imaginary sphere) for the back mirror to lie on the optical axis. The focal point of the back mirror advantageously lies on the optical axis between the back mirror and the outcoupling mirror. It is also advantageous for the center point of a sphere (an imaginary sphere) for the outcoupling mirror to lie on the optical axis. For the above-mentioned same reason, it is advantageous for the focal point of the outcoupling mirror to lie on the optical axis between the back mirror and the outcoupling mirror. It is particularly advantageous for the focal points of outcoupling mirror and back mirror to coincide. A negative-branch resonator is then provided. An optimized guidance of the radiation in the resonator is thereby achieved, and, in particular, radiation can be coupled out parallel to the optical axis in an outcoupling region.

Optimum outcoupling is achieved when the common focal point lies closer to the outcoupling mirror than to the back mirror. Radiation which originates from a certain region of the outcoupling mirror and is reflected at the back mirror can thereby be "fanned out", i.e., the return reflection region at the back mirror is larger than the starting region at the outcoupling mirror. In turn, radiation can thereby be coupled out in a simple way. The outcoupling can take place via a compact area (with "maximum" connectivity) and, in turn, a more homogenous distribution of intensity in the far field is thereby made possible.

It is advantageous for the radius of the back mirror to differ from the radius of the outcoupling mirror. In turn, optimized outcoupling is thereby obtained. It is particularly advantageous for the radius of the back mirror to be larger than the radius of the outcoupling mirror. The optimum ratio of the radii depends, inter alia, on the optically active medium. In an exemplary embodiment, a ratio of the radii of between 1.1 and 1.2 was chosen. However, this ratio can also be smaller or larger.

To obtain optimized laser activity, the lateral dimensions of the back mirror are advantageously larger than the corresponding lateral dimensions of the optically active medium and/or of a receptacle for the optically active medium. The lateral dimensions are the dimensions in the directions transverse to the optical axis. It is then ensured that radiation within the resonator will pass through the optical medium. With gas as optically active medium, the receptacle in which the gas is accommodated or through which the gas flows will define the lateral dimensions of the back mirror.

For the same reason, it is advantageous for the lateral dimensions of the outcoupling mirror to be larger outside of an outcoupling region than the corresponding lateral dimensions of the optically active medium and/or of the receptacle for the optically active medium. Radiation is coupled out via the outcoupling region, so there must be no return reflection here.

It is advantageous for a outcoupling region to be of asymmetrical configuration in relation to the optical axis. A compact surface is thereby made available for the outcoupling region, whereby an advantageous mode distribution with a time-independent mode and a far field is obtained, which in comparison with known unstable resonators with small outcoupling has a less highly structured distribution of intensity.

The asymmetrical outcoupling can be carried out by the outcoupling mirror being correspondingly shaped and/or the beam path within the resonator being correspondingly influenced. An effective mirror region of the outcoupling mirror is asymmetrical in relation to the optical axis, and this effective mirror region is produced by shaping the mirror or by influencing the beam path.

In particular, an outcoupling region is associated with the outcoupling mirror. Radiation is coupled out of the resonator via this outcoupling region. The outcoupling region is advantageously spaced from the optical axis. An optimized outcoupling is thereby achieved, and the inventive resonator is then also usable together with optically active media with large diameter and/or small gain. Provision is made for the outcoupling region to be designed in accordance with the power to be coupled out. In particular, the geometrical shape of the outcoupling region and/or the arrangement of the outcoupling region are such that the desired power is coupled out. Provision may be made for the outcoupling mirror itself to be designed such that an asymmetrical outcoupling takes place. For example, in a spherical mirror a half-ring region is cut out, and this cut-out half-ring region then defines the outcoupling region.

Alternatively or additionally, provision may also be made for a scraper to be arranged between back mirror and outcoupling mirror. The scraper defines in its arrangement and design the radiation component which reaches the outcoupling mirror and which is reflected outwards at the scraper, i.e., is coupled out. A scraper is a mirror which has an aperture through which radiation can pass, and a mirror surface which, in particular, is arranged at or around the aperture and via which the radiation can be coupled out. The combination of outcoupling mirror and scraper then defines the outcoupling region. In particular, the scraper is arranged and designed such that an asymmetrical outcoupling will take place. For example, the scraper is only arranged on one side with respect to a plane containing the optical axis. In particular, a mirror surface of the scraper defines an outcoupling region.

A mirror surface of the scraper is advantageously adapted to the optical medium and/or to a receptacle for the optical medium. Radiation can thereby be coupled out in a defined manner and, in particular, with a defined power. Provision may be made for the scraper to be arranged substantially at a 45° angle to the optical axis. Radiation can thereby be coupled out of the resonator at a right angle to the optical axis.

For the asymmetrical outcoupling, there is advantageously associated with the outcoupling mirror a first mirror region which lies on the one side of a plane containing the optical axis, and there is associated with the outcoupling mirror a second mirror region which lies on the other side of this plane, with the two mirror regions being of different design. An asymmetry is thus made available, which provides for the asymmetrical outcoupling. The two mirror regions can be directly formed on the mirror or these can be effective mirror regions which are adjusted by influencing the beam, for example, by means of a scraper.

In particular, the first mirror region has a larger mirror surface than the second mirror region so as to obtain an asymmetrical outcoupling. Provision may be made for an outcoupling region to surround the second mirror region. Furthermore, provision may be made for the first mirror region and the second mirror region to be joined in the plane containing the optical axis. In particular, the second mirror region has smaller lateral dimensions than the first mirror region. An asymmetry is thus made available, which, in turn, allows an asymmetrical outcoupling with the corresponding advantages.

In order to obtain an asymmetrical outcoupling in relation to an axis transverse and, in particular, perpendicular to the optical axis, the second mirror region is advantageously of axially symmetrical design in relation to such an axis. The first mirror region is also advantageously of axially symmetrical design in relation to such an axis. In relation to an axis lying transversely to this axis and transversely to the optical axis, the second mirror region is of asymmetrical design.

In one embodiment the first mirror region is semicircular with respect to its outer circumference. Such a mirror region can be produced in a simple way. Provision may also be made for the second mirror region to be semicircular with respect to its outer circumference. However, other geometrical shapes are also possible. The shaping of the second mirror region does not necessarily have to be effected mechanically. If the second mirror region is an effective mirror region which is defined by irradiation, then an aperture in a scraper defines the shaping of the second mirror region. Adaptation to the cross section of the optically active medium is possible via a scraper.

Provision is made for a projection of the optically active medium parallel to the optical axis onto the back mirror to lie within an illuminated region of the back mirror. The projection of the optically active medium can be a projection of the medium itself, the projection of a receptacle for the optically active medium or the projection of a flow space for the optically active medium onto the back mirror. It is then ensured that radiation from the back mirror (running parallel to the optical axis) goes through the optically active medium.

The resonator according to the invention can be used with advantage in a laser. It is advantageous for a laser device and, in particular, a gas laser device to comprise a resonator according to the invention. Provision may then be made for a flow space to be arranged between the back mirror and the outcoupling mirror for gas to flow therethrough. A high laser power is thereby achievable.

The following description of preferred embodiments serves in conjunction with the drawings to explain the invention in greater detail.

BRIEF DESCRIPTION OF THE DRAWINGS

Preferred exemplary embodiments of the invention are explained in more detail hereinbelow with reference to the drawings, which are not necessarily drawn to scale, and wherein.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
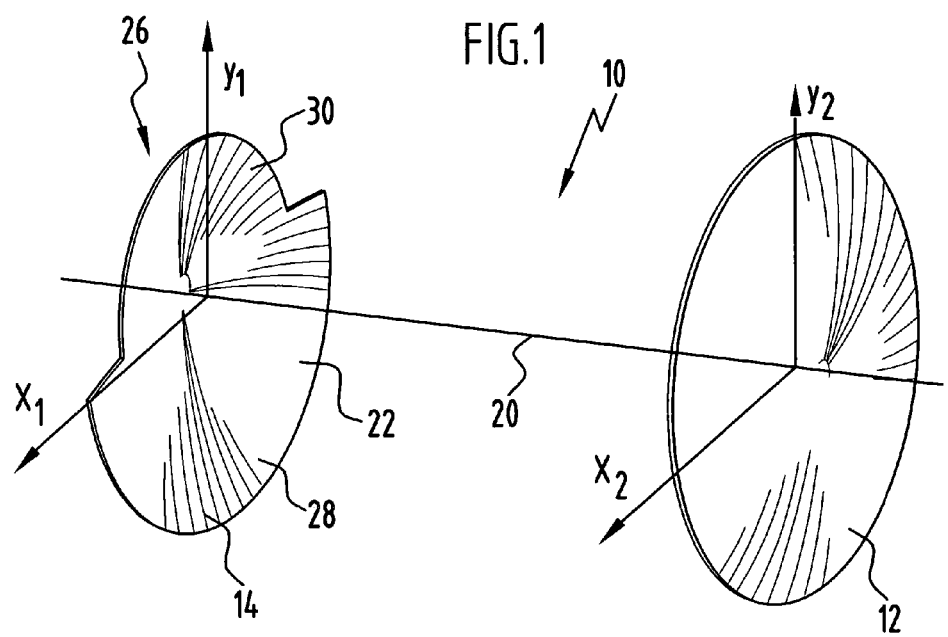
FIG. 1 shows a schematic perspective representation of a first embodiment of a resonator in accordance with the invention.
Figure 2:
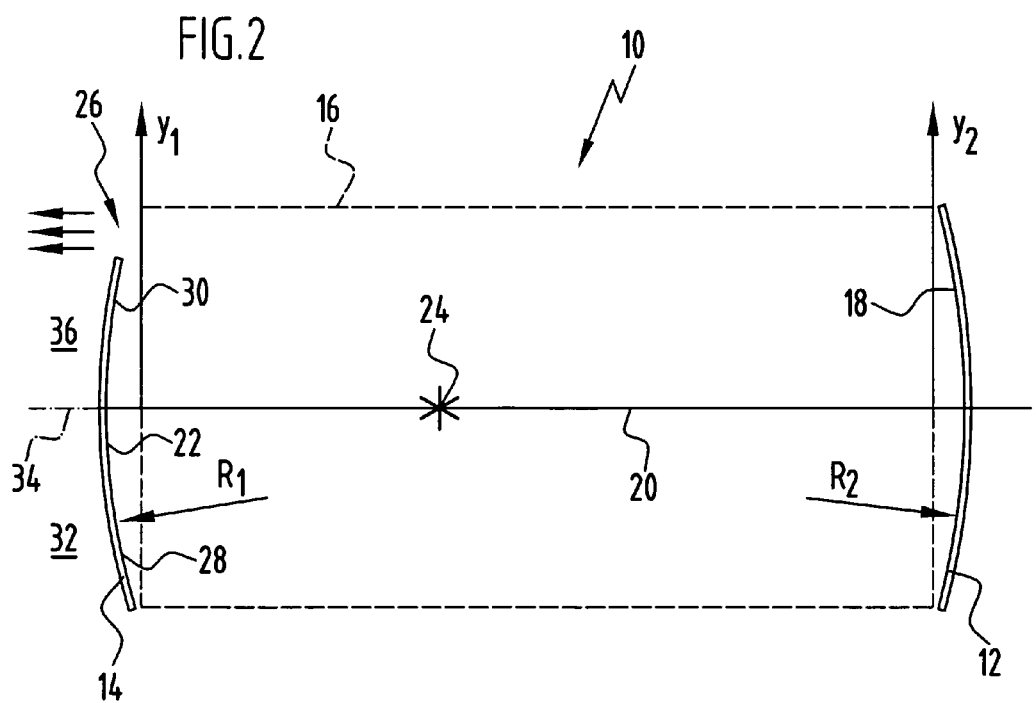
FIG. 2 shows a sectional representation of the resonator according to FIG. 1 in a plane containing the optical axis and the axes $y_1$, $y_2$.
Figure 7:
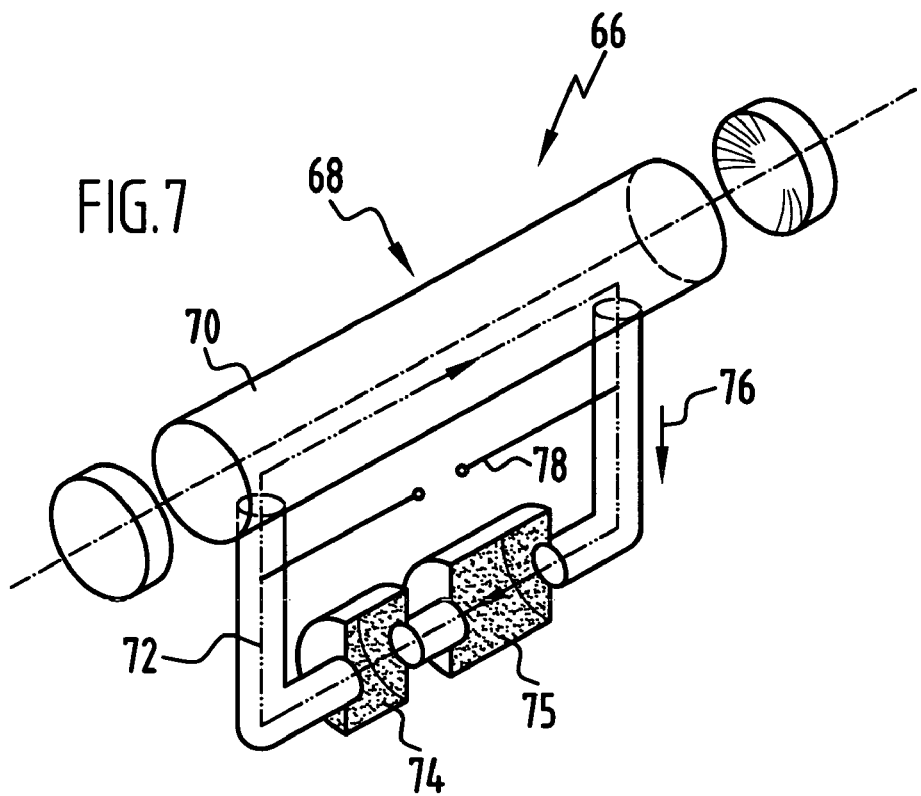
FIG. 7 shows a schematic representation of a first embodiment of a gas laser device.
Figure 8:
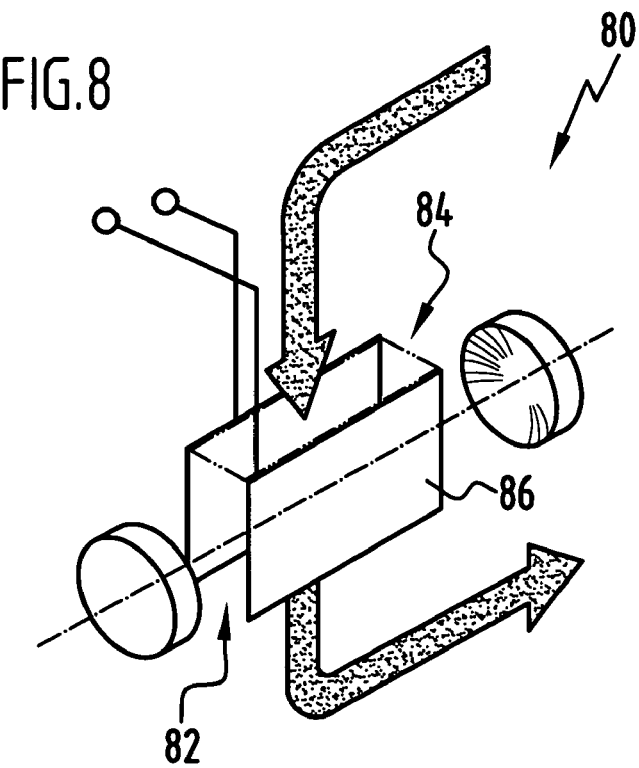
FIG. 8 shows a schematic representation of a second embodiment of a gas laser device.

A first embodiment of an unstable optical resonator according to the invention, which is shown in FIGS. 1 and 2 and is generally designated therein by reference numeral 10, comprises a back mirror 12 and an outcoupling mirror 14. The two mirrors 12 and 14 are spaced from each other, and the optically active medium 16 is arranged or guided between these mirrors. In particular, in the case of a gas laser, a receptacle, which accommodates the optically active medium, or a flow space, through which the optically active medium flows, is arranged between the mirrors 12, 14. Such a receptacle or container is shown in FIG. 7 and designated therein by the reference numeral 70. A flow space 84 is shown in FIG. 8.

The back mirror 12 is of spherical design with a concave surface 18, which faces the optically active medium 16. This concave surface 18 has a certain radius $R_2$. The concave surface 18 lies on the surface of an imaginary sphere, and the radius is measured with respect to the center point of the sphere. The imaginary center point of the sphere lies on an optical axis 20.

The outcoupling mirror 14 is likewise of spherical design with a spherical, concave surface 22, which faces the optically active medium 16. The two concave surfaces 18 and 22 thus face each other. The concave surface 22 lies on the surface of an imaginary sphere, and the center point of this imaginary sphere lies on the optical axis 20. This imaginary sphere has a radius $R_1$, which corresponds to the radius of the concave surface 22.

The radius $R_2$ of the back mirror 12 for its concave surface 18 is larger than the radius $R_1$ of the outcoupling mirror 14 for its concave surface 22. In an exemplary embodiment, the ratio of the radius of the back mirror 12 to the radius of the outcoupling mirror 14 ($R_2/R_1$) is between 1.1 and 1.2. However, smaller ratios (greater than 1) or larger ratios are also possible.

The back mirror 12 has a focal point 24 which lies on the optical axis 20. The outcoupling mirror 14 likewise has a focal point which lies on the optical axis. The two mirrors 12 and 14 are arranged and designed such that their focal points substantially coincide. The focal point designated by reference numeral 24 in FIG. 2 is then the focal point of both back mirror 12 and outcoupling mirror 14. The coinciding focal point 24 of the two mirrors 12, 14 preferably lies closer to the outcoupling mirror 14 than to the back mirror 12.

The back mirror 12 has larger lateral dimensions (transversely to the optical axis 20), so that it covers the optically active medium 16 or the receptacle for the optically active medium. Provision may be made for the lateral dimensions of the back mirror 12 to be larger in order to, for example, take diffraction losses into consideration.

A projection of the optically active medium in a direction parallel to the optical axis 20 onto the back mirror 12 lies within an illuminated region of the back mirror 12. The illuminated region is defined by the spacing between the back mirror 12 and the outcoupling mirror 14 and by the radii of these two mirrors 12, 14 and the design of the outcoupling mirror 14 (or a scraper, as will be described in greater detail hereinbelow). With a given optical medium or receptacle for the optical medium or flow space for the optical medium, the mirrors 12, 14 are then to be designed in such a way that the optical medium does not project beyond the illuminated region of the back mirror 12 and is therefore not illuminated in a projecting region.

Since the radiation emanating from the back mirror 12 is oriented parallel to the optical axis 20, the projection of the optically active medium parallel to the optical axis 20 must lie within the illuminated region. With the exception of an outcoupling region, which will be explained in greater detail hereinbelow, the outcoupling mirror 14 likewise has such lateral dimensions that the optically active medium 16 is covered transversely to the optical axis 20.

The resonator 10 is a confocal optical resonator with negative branch, i.e., the focal point 24 lies between the mirrors 12 and 14. Furthermore, the resonator 10 is asymmetrical in relation to the optical axis 20, i.e., an asymmetrical optical outcoupling takes place. Such an asymmetrical outcoupling is caused by an asymmetry in the beam path between the two mirrors 12 and 14.

In the embodiment according to FIGS. 1 and 2, there is associated with the outcoupling mirror 14 an outcoupling region 26, which is brought about by corresponding design of the outcoupling mirror 14. To this end, the outcoupling mirror 14 has a first mirror region 28 and a second mirror region 30. The two mirror regions 28, 30 are integrally joined and comprise the concave surface 22. The first mirror region 28 lies on one side 32 of a plane 34 which contains the optical axis 20 and the axes $x_1$, $x_2$. The second mirror region 30 lies on the other side 36 of this plane 34. The two mirror regions 28, 30 are joined together in the plane 34.

The second mirror region 30 has a smaller surface than the first mirror region 28. The second mirror region 30 is therefore different in design to the first mirror region 28. Relative to the $x_1$ axis, it is set back from the second mirror region 30 and is likewise set back relative to the $y_1$ axis. The height of the second mirror region 30 in direction $y_1$ is therefore smaller than the height of the first mirror region 28 in the same direction.

In the illustrated exemplary embodiment, the first mirror region 28 is of semicircular design with respect to its outer contours. The second mirror region 30 is likewise of semicircular design, but has a smaller radius than the first mirror region 28. Here, radius means radius of a circle and not radius $R_1$ of the imaginary sphere for the concave surface 18. The outer dimensions of the first mirror region 28 correspond to the outer dimensions of an opposite region of the back mirror 12. The region of the back mirror 12 located opposite the second mirror region 30 is, however, larger than the second mirror region 30. Other designs are also possible for the mirror region. For example, the second mirror region can extend into the half-space 32. In the illustrated embodiment the outcoupling region 26 surrounds the second mirror region 30 in the shape of a half ring.

In the unstable confocal negative-branch resonator 10, radiation emanating from a region comprising the second mirror region 30 and its circular continuation into the first mirror region 28 impinges on the back mirror 12 after passing through the focal point 24. The radiation reflected in a corresponding region at the back mirror 12 travels parallel to the optical axis 20 to the outcoupling mirror 14. The reflection region at the back mirror 12 is larger than the "starting region" of the outcoupling mirror 14, as the back mirror 12 has a larger radius $R_2$ and the focal point 24 lies closer to the outcoupling mirror 14. The radiation reflected by the back mirror 12 then impinges again on the outcoupling mirror 14 in a region which is larger than the second mirror region 30. In particular, this region comprises a half-ring surface at the first mirror region 28 on the side 32 of the plane 34. The diameter of this ring region corresponds to the diameter of the return reflection region in the back mirror 12. The radiation coming in on the side 36, which does not impinge on the second mirror region 30, i.e., lies in the outcoupling region 26, leaves the resonator 10.

The radiation impinging on the outcoupling mirror 14 is reflected and, after passing through the focal point 24, reaches the back mirror 12 again. This passes into the above-mentioned return reflection region if the radiation originates from the second mirror region 30. The radiation which originates from the above-mentioned half-ring region impinges on a region of the back mirror 12 adjacent to this return reflection region, which lies on the side 36 of the optical axis. The region lying below the optical axis 20 (i.e., the region lying on the side 32), which lies outside the return reflection region, is not illuminated. The radiation then reflected again from the back mirror 12 impinges on the outcoupling mirror 14, and part of the radiation reflected at the back mirror 12 reaches the outcoupling region 26 and leaves the resonator 10.

With the design of the outcoupling mirror 14 shown, radiation leaves the resonator 10 in a semicircular region (disregarding diffraction). The coupled out power can be adjusted by corresponding adjustment of the outcoupling region, i.e., by corresponding adjustment of the mirror region 30.

Figure 3:
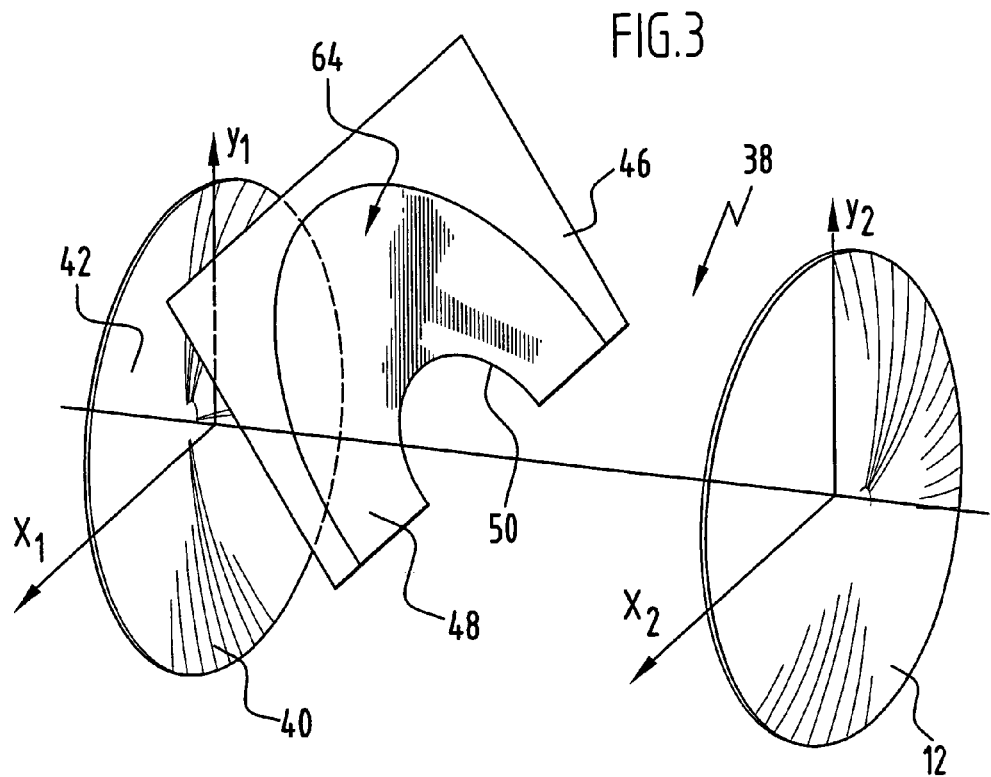
FIG. 3 shows a second embodiment of a resonator in accordance with the invention.
Figure 4:
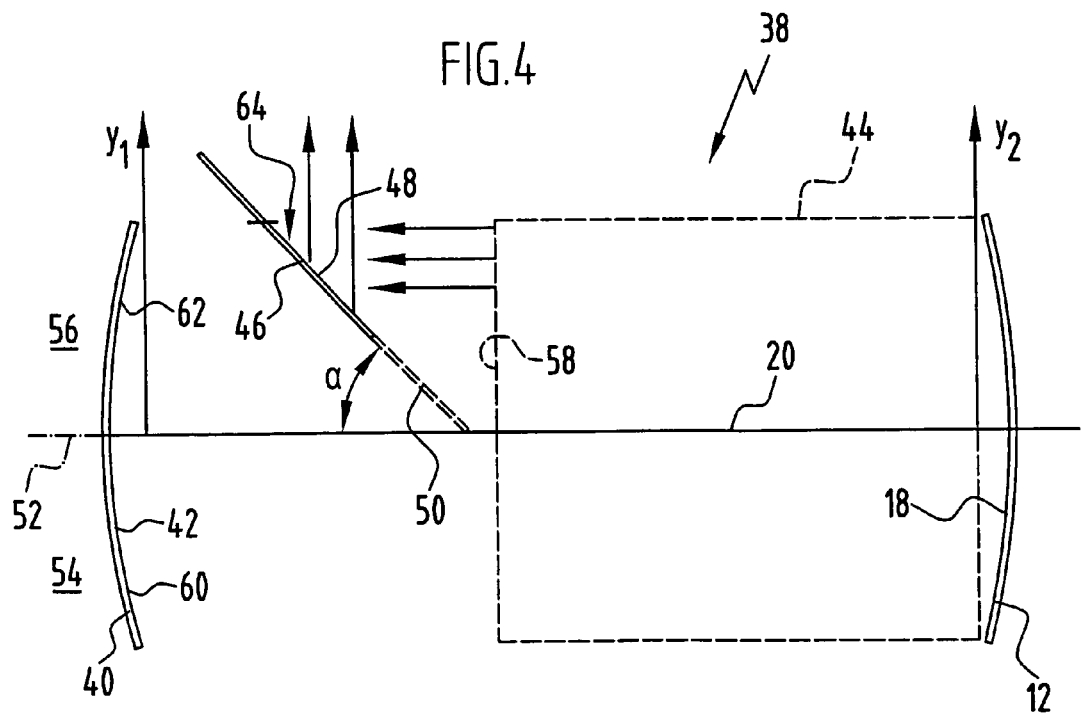
FIG. 4 shows a sectional representation of the resonator according to FIG. 3 in a plane containing the optical axis and the axes $y_1$, $y_2$.

In a second embodiment of an unstable confocal negative-branch resonator according to the invention, which is shown schematically in FIGS. 3 and 4 and generally designated therein by reference numeral 38, the back mirror is basically of the same design as described hereinabove. The same reference numerals are therefore used therefor. The back mirror 12 is again arranged symmetrically in relation to the optical axis 20. An outcoupling mirror 40 is provided. This again has a spherically concave surface 42 facing an optical medium 44 or a receptacle or flow space for an optical medium. The outcoupling mirror 40 is of symmetrical design with a radius (based on an imaginary sphere, the surface 42 of which represents a surface region) which is smaller than the radius of a corresponding imaginary sphere for the back mirror 12. The focal point of the two confocal mirrors 12 and 40 coincides (negative branch), and this focal point preferably lies closer to the outcoupling mirror 40.

For the asymmetrical outcoupling of radiation, a scraper 46 is arranged between the two mirrors 12 and 40. This scraper is an element with a mirror surface 48 at which radiation is reflected so as to be coupled out of the resonator 38. Furthermore, the scraper 46 has an aperture 50 permeable to radiation, through which radiation reflected from the back mirror 12 can pass to the outcoupling mirror 40. The aperture 50 is smaller than the mirror surface of the outcoupling mirror 40.

The optical axis 20 defines a plane 52 with a side 54 and an opposite side 56. The plane 52 separates the two sides 54, 56. The sides 54 and 56 are therefore half-spaces. The scraper 46 is seated, for example, on one side, for example, on side 56. It does not influence the beam path on the side 54. It is also possible for the scraper to extend beyond the plane containing the optical axis 20. The aperture of the scraper is then of corresponding design.

The mirror surface 48 of the scraper 46 is also arranged and designed such that in its transverse dimensions (in the $x_1$-$y_1$ plane) it is at least as large as the optically active medium 44 or its receptacle in the region 58 of the optically active medium 44 or its receptacle that faces the scraper 46, with the exception of the aperture 50. For example, the scraper 46 is arranged at an angle of 45° to the optical axis 20. Thus, radiation can be coupled out of the resonator 38 parallel to the optical axis 20 at right angles to the optical axis 20.

Owing to the scraper 46 with its aperture 50 there is associated with the outcoupling mirror 40 a first mirror region 60 and a second mirror region 62, with the aperture 50 defining the second mirror region 62. The first mirror region 60 corresponds to the first mirror region 28 in resonator 10. The second mirror region 62 corresponds to the second mirror region 30 in resonator 10. The second mirror region 62 in the resonator 38 is not obtained by the design and, in particular, shaping of the outcoupling mirror, but by the arrangement and shaping of the scraper 46. An outcoupling region 64 for radiation from the resonator 38 is defined by the design and arrangement of the mirror surface 48 of the scraper 46. The resonator 38 is an asymmetrical, confocal, unstable optical negative-branch resonator.

The aperture 50 can be adapted to the optically active medium 44 or a receptacle. For example, with a round laser rod a round aperture will be selected, whereas with a rectangular receptacle or rectangular laser rod a rectangular aperture 50 will be selected. With fixed mirrors 12, 40, a desired outcoupling, in particular, with respect to the desired outcoupling region can then be adjusted by corresponding choice of a scraper 46 with aperture 50 and mirror surface 48. Furthermore, adaptation to the optically active medium 44 is possible in a simple way.

In the preferred embodiments shown, the mirrors 12, 14 and 40 are of circular or semicircular shape with respect to their outer dimensions. Other shapes are also possible.

In accordance with the invention, an unstable optical resonator with spherical mirrors 12, 14 and 12, 40, respectively, is provided. It is a purely unstable resonator without stable direction. The problems that occur in conjunction with stable resonators are thus avoided. In particular, the formation of a high multimode with an intensity distribution varying with respect to time is avoided. High resonator losses occur with cylindrical mirrors when the mirror is narrow in the plane (stable) direction. Furthermore, cylindrical mirrors are very sensitive to adjustment in stable direction (as planar mirror surfaces are located opposite). With the solution according to the invention with spherical mirrors 12, 14 and 12, 40, respectively, the tolerances required for resonator operation are easier to achieve. The resonator is therefore easier to construct. Moreover, spherical mirrors are more favorably priced and easier to obtain than cylindrical mirrors. In particular, adjustment of the mirrors 12, 14 and 12, 40, respectively, is easier than, for example, with cylindrical mirrors, and the resonator in accordance with the invention is less sensitive to deviations in mirror radii and tiltings in comparison with cylindrical mirrors.

By using a scraper, it is also possible to carry out an adaptation of, for example, round or rectangular cross sections for the optically active medium. In contrast, cylindrical mirrors are only optimal for rectangular medium cross section. With the solution according to the invention with spherical mirrors 12, 14 and 12, 40, respectively, there are no limitations with respect to the width as with cylindrical mirrors. A width which is too small in the stable direction causes a high resonator loss in the case of cylindrical mirrors, whereas a width which is too large may result in a mode which is variable with respect to time.

Figure 5:
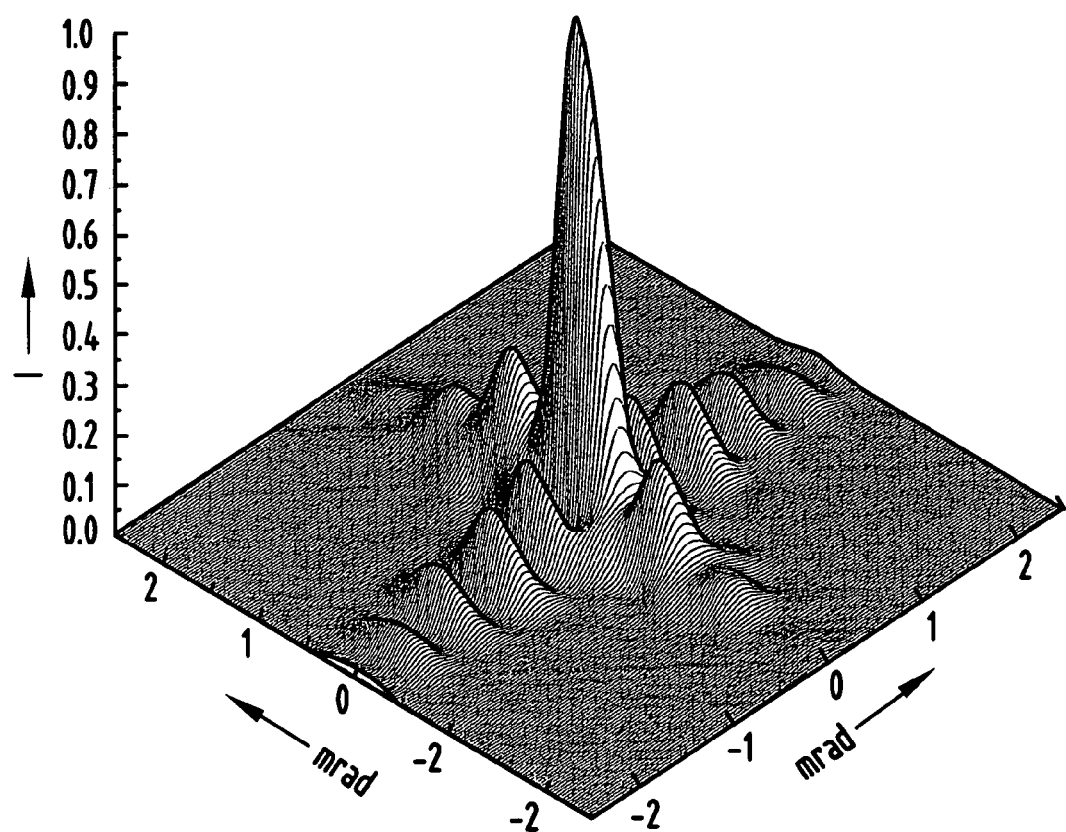
FIG. 5 shows a calculated distribution of intensity in the far field for a laser device with the resonator according to FIG. 1 or FIG. 3.
Figure 6:
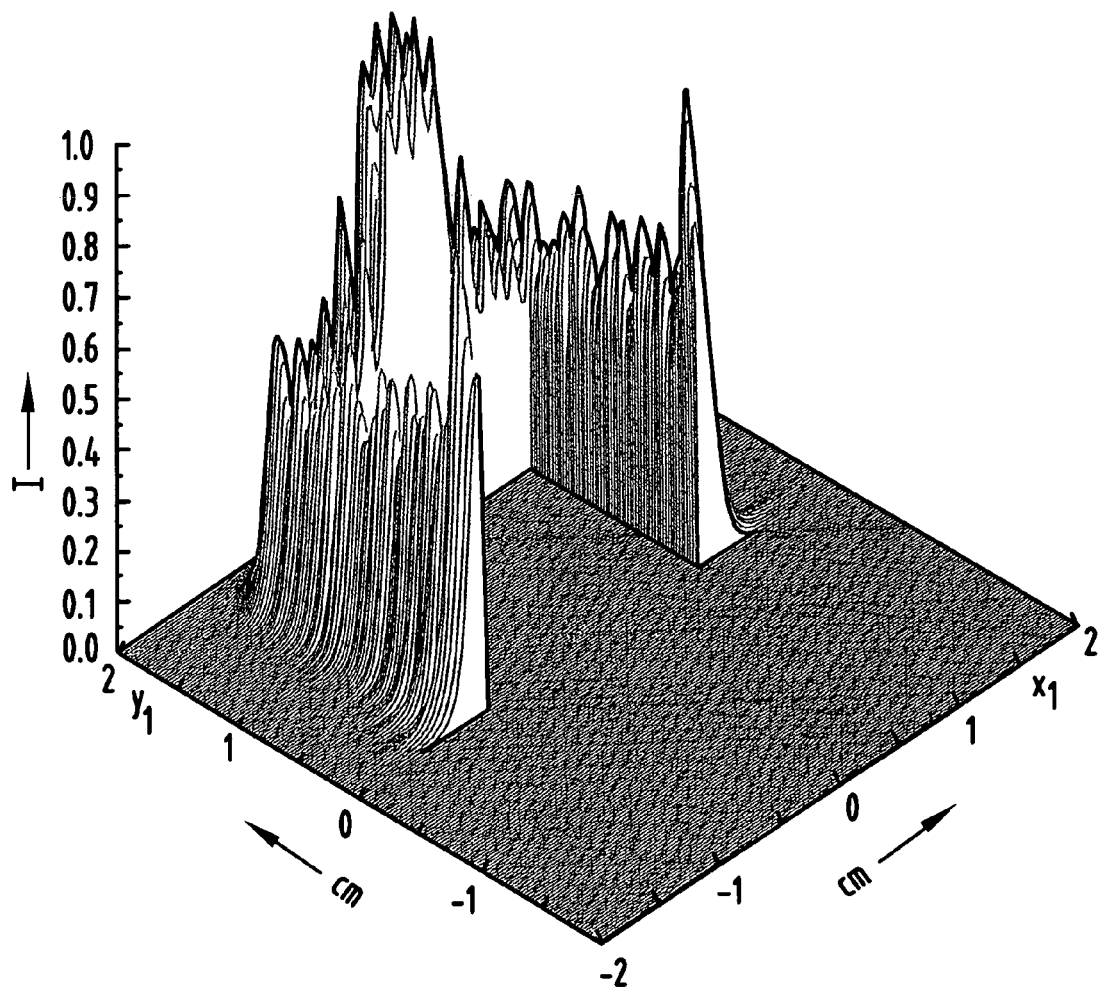
FIG. 6 shows a calculated distribution of intensity in the near field for a laser device with a resonator according to FIG. 1 or FIG. 3.

FIGS. 5 and 6 show field diagrams for the resonators 10 and 38, respectively. FIG. 5 shows the calculated distribution of intensity in the far field with respect to angles relative to the $x_1$ axis and $y_1$ axis. When plotted over these divergence angles, an independence with respect to the spacing from the outcoupling mirror is achieved. Compact distribution of the intensity in the far field is evident.

FIG. 6 shows the calculated distribution of intensity in the near field in the $x_1$-$y_1$ plane. The optical axis passes through the point 0-0. The influence on the near field by a corresponding shaping of the outcoupling regions 26 and 64, respectively, is evident.

The inventive resonators can be used with advantage together with optically active media which have a small gain and require a large cross section. A time-independent mode and in the far field an intensity distribution which is not too highly structured are thereby achievable. In particular, the solution according to the invention may be used together with gas laser devices.

FIG. 7 shows schematically a first embodiment of a gas laser device 66. This comprises an inventive resonator 68, which is basically designed as described hereinabove with reference to the first embodiment 10 or the second embodiment 38.

A receptacle 70 for the optically active gas medium is arranged in the resonator 68. A gas is conducted in a flow guide 72 through this receptacle 70. A pump 74 is provided for this purpose. A gas reservoir 75 is arranged in the flow guide 72. The direction of flow is indicated by the arrow designated by reference numeral 76. The output power of the laser device 66 can be increased by a longitudinal gas flow in the receptacle 70. The gas is excited by an applied high voltage (indicated by reference numeral 78 in FIG. 7).

A resonator 82 according to the invention is again provided in a second embodiment of a gas laser device shown schematically in FIG. 8 and generally designated therein by reference numeral 80. A flow space 84 for gas flowing therethrough is arranged in the resonator 82. A high voltage is applied (electrodes are indicated by reference numeral 86 in FIG. 8) to excite the gas. The gas flows through the flow space 84 transversely to the direction of the radiation (i.e., transversely to the optical axis 20). In the example shown, the discharge takes place transversely to the laser beam and the gas likewise flows transversely to the laser beam. Very high output powers are thereby achievable.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. Unstable optical resonator for an optically active medium comprising:
    a spherical back mirror; and
    a spherical outcoupling mirror;
    wherein an outcoupling which is asymmetrical in relation to the optical axis takes place by an outcoupling region which is of asymmetrical configuration in relation to the optical axis;
    wherein the optical resonator is purely unstable;
    wherein a first mirror region of semi-circular design lying on one side of a plane containing the optical axis and a second mirror region of semi-circular design lying on the other side of this plane are associated with the outcoupling mirror, and wherein the two mirror regions differ in design and the second mirror region has a smaller radius than the first mirror region.

2. Unstable optical resonator in accordance with claim 1, wherein a concave mirror surface of the back mirror faces the optically active medium.

3. Unstable optical resonator in accordance with claim 1, wherein a concave mirror surface of the outcoupling mirror faces the optically active medium.

4. Unstable optical resonator in accordance with claim 1, wherein the focal points of the back mirror and the outcoupling mirror lie between these two mirrors.

5. Unstable optical resonator in accordance with claim 1, wherein a center point of a sphere for the back mirror lies on the optical axis.

6. Unstable optical resonator in accordance with claim 5, wherein the focal point of the back mirror lies on the optical axis between the back mirror and the outcoupling mirror.

7. Unstable optical resonator in accordance with claim 1, wherein a center point of a sphere for the outcoupling mirror lies on the optical axis.

8. Unstable optical resonator in accordance with claim 7, wherein the focal point of the outcoupling mirror lies on the optical axis between the back mirror and the outcoupling mirror.

9. Unstable optical resonator in accordance with claim 1, wherein the focal points of outcoupling mirror and back mirror coincide.

10. Unstable optical resonator in accordance with claim 9, wherein the common focal point lies closer to the outcoupling mirror than to the back mirror.

11. Unstable optical resonator in accordance with claim 1, wherein the radius of the back mirror differs from the radius of the outcoupling mirror.

12. Unstable optical resonator in accordance with claim 11, wherein the radius of the back mirror is larger than the radius of the outcoupling mirror.

13. Unstable optical resonator in accordance with claim 1, wherein the lateral dimensions of the back mirror are larger than the corresponding lateral dimensions of at least one of the optically active medium and a receptacle for the optically active medium.

14. Unstable optical resonator in accordance with claim 1, wherein the lateral dimensions of the outcoupling mirror outside of an outcoupling region are larger than the corresponding lateral dimensions of at least one of the optically active medium and a receptacle for the optically active medium.

15. Unstable optical resonator in accordance with claim 1, wherein an effective mirror region of the outcoupling mirror is asymmetrical in relation to the optical axis.

16. Unstable optical resonator in accordance with claim 1, wherein an outcoupling region is associated with the outcoupling mirror.

17. Unstable optical resonator in accordance with claim 16, wherein the outcoupling region is spaced from the optical axis.

18. Unstable optical resonator in accordance with claim 16, wherein the outcoupling region is configured in accordance with a desired power to be coupled out.

19. Unstable optical resonator in accordance with claim 1, wherein the outcoupling mirror is designed such that an asymmetrical outcoupling will take place.

20. Unstable optical resonator in accordance with claim 1, wherein the first mirror region has a larger mirror surface than the second mirror region.

21. Unstable optical resonator in accordance with claim 20, wherein an outcoupling region surrounds the second mirror region.

22. Unstable optical resonator in accordance with claim 1, wherein the first mirror region and the second mirror region are joined in the plane containing the optical axis.

23. Unstable optical resonator in accordance with claim 1, wherein the second mirror region has smaller lateral dimensions than the first mirror region.

24. Unstable optical resonator in accordance with claim 1, wherein the second mirror region is of axially symmetrical design in relation to an axis extending perpendicularly to the plane containing the optical axis.

25. Unstable optical resonator in accordance with claim 1, wherein a projection of the optically active medium parallel to the optical axis onto the back mirror lies within an illuminated region of the back mirror.

26. Gas laser device, comprising:

an unstable optical resonator for an optically active medium, said resonator having a spherical back mirror and a spherical outcoupling mirror, with an outcoupling which is asymmetrical in relation to the optical axis taking place therein by an outcoupling region which is of asymmetrical configuration in relation to the optical axis;

wherein the optical resonator is purely unstable;

wherein a first mirror region of semi-circular design lying on one side of a plane containing the optical axis and a second mirror region of semi-circular design lying on the other side of this plane are associated with the outcoupling mirror, and wherein the two mirror regions differ in design and the second mirror region has a smaller radius than the first mirror region.

27. Gas laser device in accordance with claim 26, wherein a flow space for gas to flow therethrough is arranged between the back mirror and the outcoupling mirror.

* * * * *